(12) United States Patent
Murata

(10) Patent No.: US 8,983,132 B2
(45) Date of Patent: Mar. 17, 2015

(54) IMAGE RECOGNITION APPARATUS AND IMAGE RECOGNITION METHOD

(71) Applicant: Jun Murata, Tokyo (JP)

(72) Inventor: Jun Murata, Tokyo (JP)

(73) Assignee: Ricoh Company, Ltd., Tokyo (JP)

(*) Notice: Subject to any disclaimer, the term of this patent is extended or adjusted under 35 U.S.C. 154(b) by 95 days.

(21) Appl. No.: 13/895,504

(22) Filed: May 16, 2013

(65) Prior Publication Data

US 2013/0329949 A1 Dec. 12, 2013

(30) Foreign Application Priority Data

Jun. 6, 2012 (JP) ................................. 2012-128876

(51) Int. Cl.
| | |
|---|---|
| *G06K 9/00* | (2006.01) |
| *G06T 7/00* | (2006.01) |
| *G06F 17/30* | (2006.01) |
| *G06K 9/46* | (2006.01) |
| *G06K 9/50* | (2006.01) |
| *G06K 9/48* | (2006.01) |

(52) U.S. Cl.
CPC .......... *G06T 7/0044* (2013.01); *G06F 17/3025* (2013.01); *G06F 17/30256* (2013.01); *G06F 17/30259* (2013.01); *G06K 9/4652* (2013.01); *G06K 9/50* (2013.01); *G06K 9/48* (2013.01)
USPC .............................. 382/103; 707/769; 358/1.1

(58) Field of Classification Search
USPC ......... 382/100, 103, 112, 162–167, 181, 190, 382/195, 203; 707/713–723, 763, 769–776; 358/1.1, 3.02
See application file for complete search history.

(56) References Cited

U.S. PATENT DOCUMENTS

| | | | |
|---|---|---|---|
| 7,595,919 B2 * | 9/2009 | Tsuji .............................. | 358/518 |
| 8,503,051 B2 * | 8/2013 | Oh et al. ........................ | 358/518 |
| 2006/0023940 A1 * | 2/2006 | Katsuyama .................... | 382/165 |
| 2006/0221356 A1 * | 10/2006 | Kawai ............................ | 358/1.1 |
| 2009/0195670 A1 * | 8/2009 | Koishi ........................ | 348/223.1 |
| 2010/0268733 A1 * | 10/2010 | Hayaishi et al. .............. | 707/769 |
| 2012/0189162 A1 * | 7/2012 | Sawada ......................... | 382/103 |

FOREIGN PATENT DOCUMENTS

| | | |
|---|---|---|
| JP | 2002-208015 | 7/2002 |
| JP | 2004-334254 | 11/2004 |
| JP | 2008-040557 | 2/2008 |

* cited by examiner

*Primary Examiner* — Anand Bhatnagar
(74) *Attorney, Agent, or Firm* — IPUSA, PLLC

(57) ABSTRACT

An image recognition apparatus includes a reception part that receives an image that has been read; a determination part that determines a registered object to correspond to an object included in the received image that has been read from among previously registered plural objects; a reflecting part that reflects colors of the image that has been read in previously stored plural similar objects each similar to the registered object determined by the determination part; and a printing control part that causes a printing apparatus to print the plural similar objects in which the colors have been reflected by the reflecting part.

20 Claims, 17 Drawing Sheets

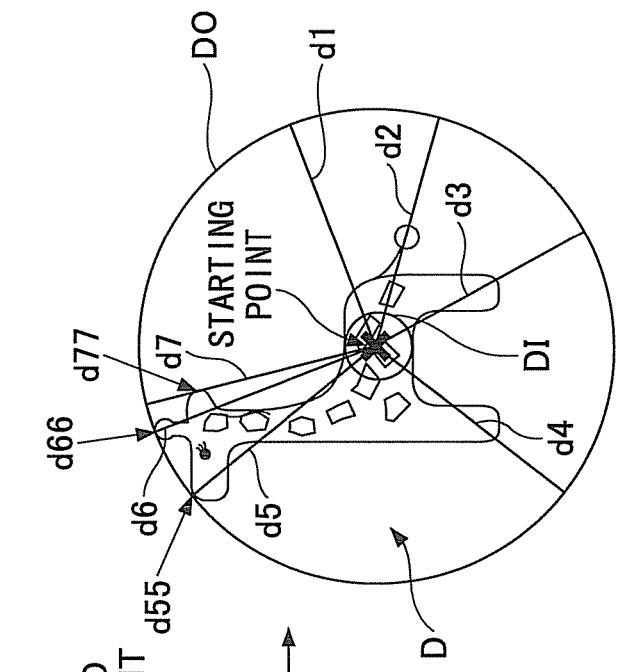
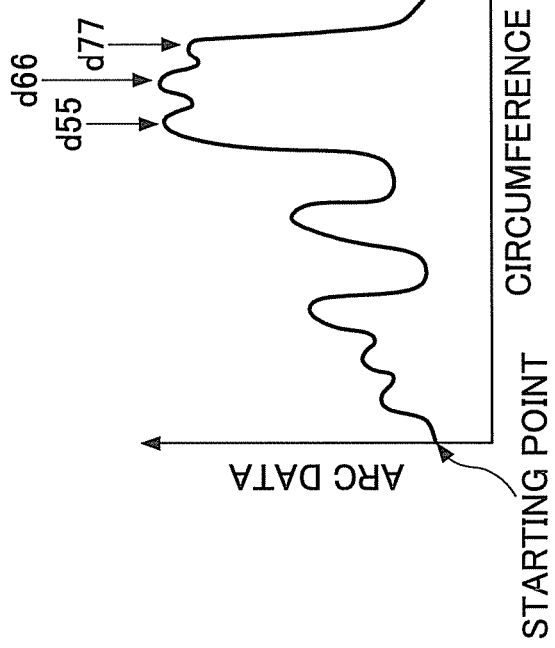

IMAGE RECOGNITION APPARATUS AND IMAGE RECOGNITION METHOD

BACKGROUND OF THE INVENTION

1. Field of the Invention

The present invention relates to an image recognition apparatus and an image recognition method.

2. Description of the Related Art

As image recognition technology of taking a still image or a moving image and recognizing an object included in the taken image, an image matching method, a feature point method or the like is known. According to the image matching method, image data of an object to recognize is previously registered, and the registered image data and an object included in the taken image are compared. Thus, it is determined what is the object included in the taken image. According to the feature point method, shapes of objects are previously registered using feature points for each object, and the registered feature points and feature points of an object included in the taken image are compared. Thus, it is determined what is the object included in the taken image.

For example, Japanese Laid-Open Patent Application No. 2002-208015 discloses technology in which in order to determine whether the outer shape of an object that is drawn in an image which is read from photographing is satisfactory, a circle characterizing the outer shape of the object is determined from the image that is read from taking the object. According to the technology, a search area is set within the outer shape of the object of the target image for searching for the center point of the circle. Then, from among the circles having the respective center points corresponding to the plural points included in the search zone, the circle satisfying the predetermined conditions is extracted as the circle characterizing the outer shape of the object.

However, according to the image matching method and the feature point method in the related art, it may be difficult to determine what is an object unless the entire shape of the target image is finely similar to the feature points of the registered image data. For example, in a case of recognizing a picture of an animal drawn by a child, it may be difficult to determine what is the drawn picture according to the image matching method and the feature point method in the related art since such a picture drawn by a child may be one that is somewhat deformed. Otherwise, an immense amount of time may be taken for searching a database or carrying out pattern matching to determine what is the drawn picture according to the image matching method and the feature point method in the related art. For example, according to the method of Japanese Laid-Open Patent Application No. 2002-208015 of determining a circle characterizing the outer shape of an object from a taken image, it may be difficult to determine what is an object drawn which is somewhat deformed such as a picture drawn by a child.

SUMMARY OF THE INVENTION

According to an embodiment, an image recognition apparatus includes a reception part that receives an image that has been read; a determination part that determine a registered object to correspond to an object included in the received image that has been read from among previously registered plural objects; a reflecting part that reflects colors of the image that has been read in previously stored plural similar objects each similar to the registered object determined by the determination part; and a printing control part configured to cause a printing apparatus to print the plural similar objects in which the colors have been reflected by the reflecting part.

Other objects, features and advantages of the present invention will become more apparent from the following detailed description when read in conjunction with the accompanying drawings.

BRIEF DESCRIPTION OF THE DRAWINGS

FIGS. 7A and 7B illustrate generation of arc data of a giraffe according to the first embodiment;

DETAILED DESCRIPTION OF THE EMBODIMENTS

Figure 1:
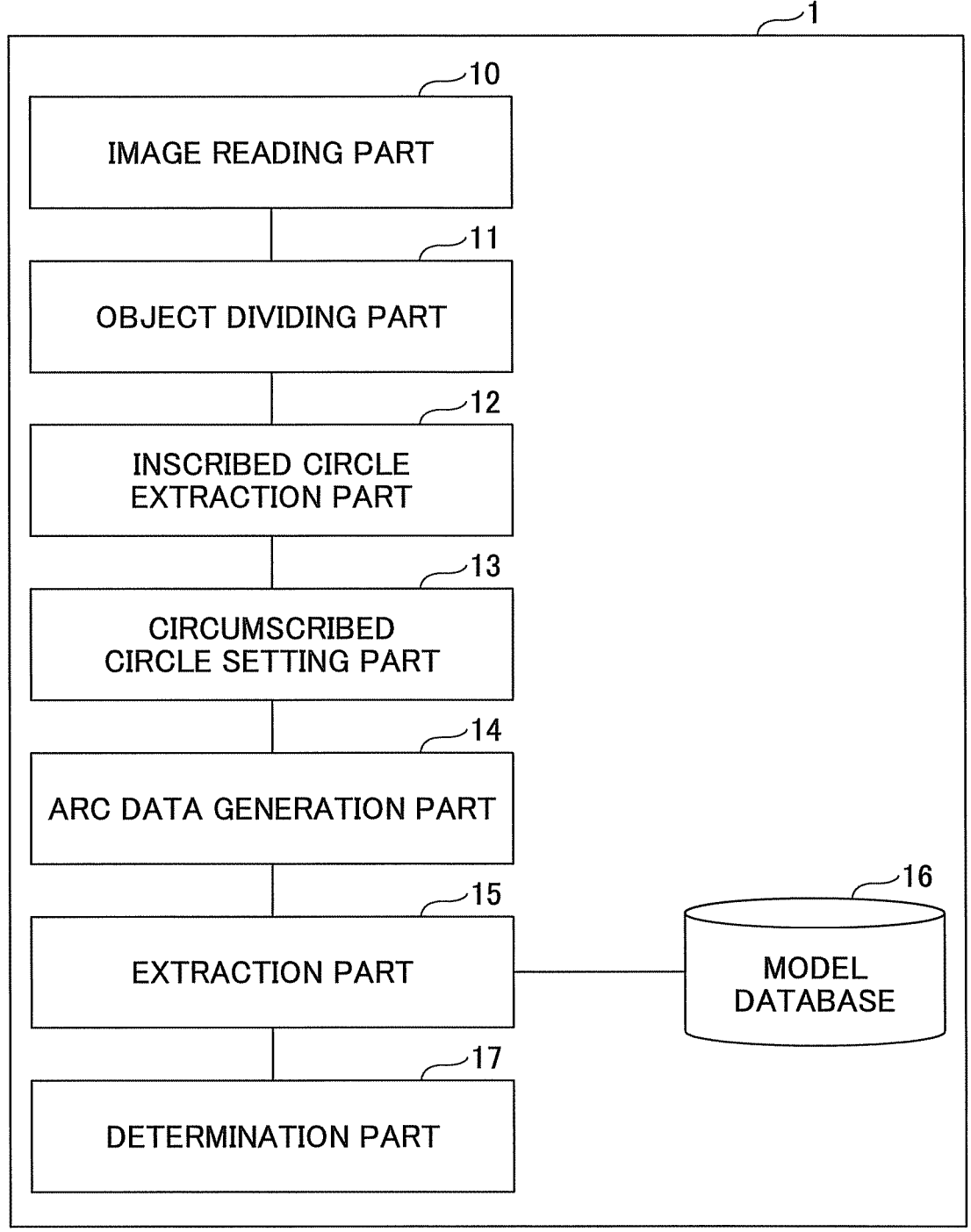
FIG. 1 is a functional configuration diagram of an image recognition apparatus according to a first embodiment.

Below, the preferable embodiments will be described using the accompanying drawings. It is noted that, in the specification and the drawings, for the parts/elements having the substantially same functional configurations, the same reference numerals are given, and duplicate description is omitted.

First Embodiment

[Entire Configuration of Image Recognition Apparatus]

First, the image recognition apparatus according to the first embodiment will be described using FIG. 1. FIG. 1 is a functional configuration diagram of the image recognition apparatus according to the first embodiment. The image recognition apparatus may have a form of a portable terminal, a tablet, a notebook PC, or another electronic apparatus.

The image recognition apparatus 1 according to the first embodiment includes an image reading part 10, an object dividing part 11, an inscribed circle extraction part 12, a circumscribed circle setting part 13, an arc data generation part 14, an extraction part 15, a model database 16 and an determination part 17.

The image reading part 10 takes an image in the image recognition apparatus 1 using a device for reading an image. As the device for reading an image, an image pickup device, a reading device or the like may be used. As the image pickup device, a camera included in a portable terminal, a video camera or the like may be used, for example. As the reading device, a scanner or the like may be used for example. The image to be thus read may be a still image such as a colored line drawing drawn by a child or may be a moving image such as an animation.

The object dividing part 11 carries out extraction of an object from an inputted still image or one frame of an inputted moving image using signal processing according to a wavelet method or the like, and divides the extracted object into plural objects, if necessary.

For example, in an example of FIG. 3 concerning a picture of a dog, in a case where an image obtained from taking a picture only including the face of the dog has been inputted, arc data (described later) of an object B of the face part of the dog is analyzed. Further, in the example of FIG. 3, in addition to the object B of the face part of the dog, arc data of an object C of an ear part of the dog is analyzed.

On the other hand, in a case where an image obtained from taking a picture of the entire body of the dog has been inputted, arc data of an object A of the entirety of the body of the dog is analyzed in addition to the object B of the face part of the dog. As a result of the analysis, the arc data of the object A indicates an overall feature of the entire body of the dog. The arc data of the object B indicates a feature of the face part of the dog. The arc data of the object C indicates a feature of the ear part of the dog.

Figure 3:
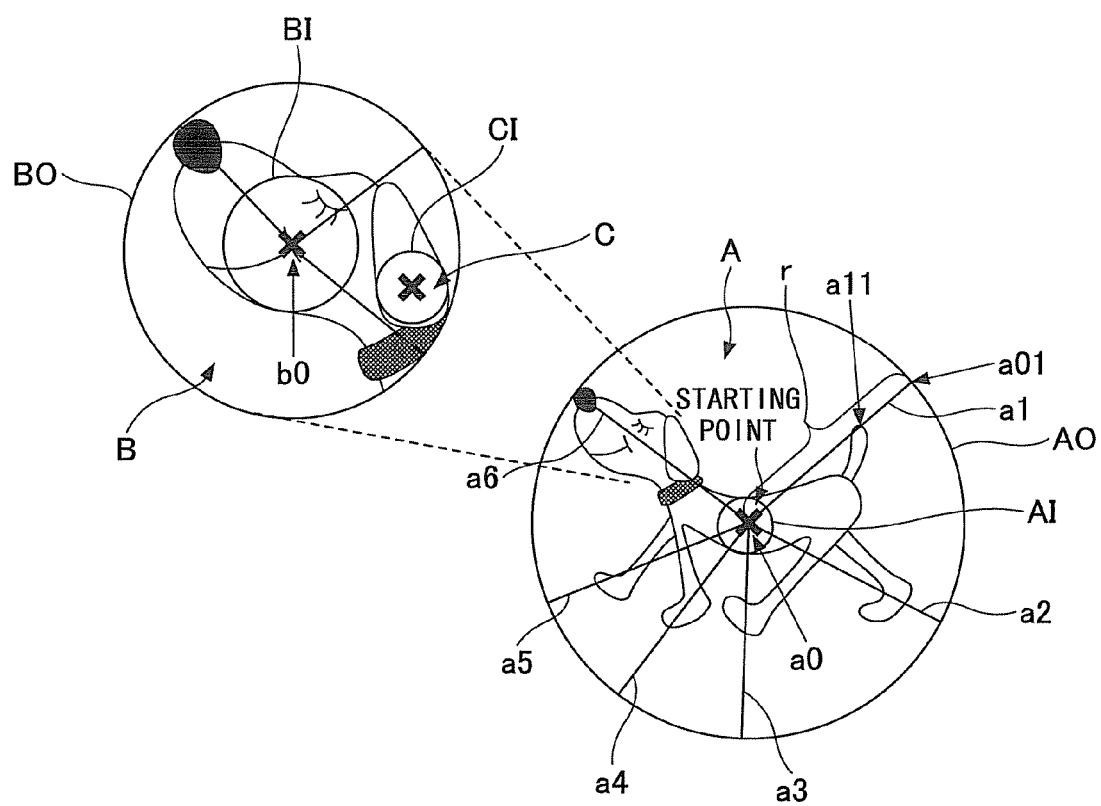
FIG. 3 illustrates setting of a circumscribed circle of a dog according to the first embodiment.

Thus, FIG. 3 shows the example in which the object A of the entire body of the dog is divided into the three objects, i.e., the object A of the entire body of the dog, the object B of the face part of the dog and the object C of the ear part of the dog. However, the actual way of the object dividing part 11 carrying out dividing an object is not limited to this. That is, the number of objects obtained from the object dividing part 11 carrying out dividing an object may be one (i.e., the single object is consequently not divided), or two or more. Such objects thus obtained from the dividing process will be targets of image recognition separately. It is noted that known technology can be used to carry out such a process of dividing an object, such as a contour extraction process. The process of dividing an object may be omitted. However, it is preferable to carry out the process of dividing an object since the accuracy of recognizing the object is improved by carrying out the process of dividing an object.

The inscribed circle extraction part 12 extracts a circle inscribed in an object included in an image that has been read. For example, the inscribed circle extraction part 12 extracts an inscribed circle having the maximum area with respect to the object. The inscribed circle extraction part 12 extracts respective inscribed circles having the maximum areas with respect to objects obtained from the object dividing part 12 dividing the object. For example, with regard to the example of FIG. 3, an inscribed circle AI having the maximum area with respect to the object A is calculated; an inscribed circle BI having the maximum area with respect to the object B is calculated; and an inscribed circle CI having the maximum area with respect to the object C is calculated.

The circumscribed circle setting part 13 sets a circumscribed circle that circumscribes the object, the center point of which is the same as the center point of the inscribed circle. For example, for the object A of the entire body of the dog, the circumscribed circle setting part 13 sets a circumscribed circle AO that circumscribes the object A, the center point a0 of which is the same as the center point a0 of the inscribed circle AI. The circumscribed circle setting part 13 thus uses the center point a0 of the inscribed circle AI as the center point a0 of the circumscribed circle AO. Thus, it is possible to derive the center point that does not depend on some variations of the shape of the object. In the example of FIG. 3, the object A touches the circumscribed circle AO at the tip of the nose of the dog.

Also for the object B of the face part of the dog, the circumscribed circle setting part 13 also sets a circumscribed circle BO circumscribing the object B, the center point b0 of which is the same as the center point b0 of the inscribed circle BI. Also for the object C of the ear part of the dog, the circumscribed circle setting part 13 sets a circumscribed circle circumscribing the object C, the center point c0 of which is the same as the center point c0 of the inscribed circle CI.

The arc data generation part 14 is a data generation part and generates a waveform corresponding to an object based on a relative position of the outer shape of the object with respect to the circumscribed circle. Specifically, the arc data generation part 14 generates a waveform corresponding to the outer shape of an object using the intersections of lines radially extending from the center point of the circumscribed circle and the outer shape (contour) of the object and the intersections of the same lines and the circumscribed circle.

For example, the arc data generation part 14 generates a point included in the waveform corresponding to the object A based on the intersection a11 (in the example of FIG. 3, the tip of the tail of the dog) of a line a1 radially extending from the center point a0 of the circumscribed circle AO and the outer shape of the object A and the intersection a01 of the line a1 and the circumscribed circle AO. The letter "r" denotes the radius of the circumscribed circle AO. Thus, the arc data generation part 14 generates information concerning the outer shape of the object A as the waveform indicating the relative position of the outer shape of the object A with respect to the circumference of the circumscribed circle AO, based on the relative position of the position of the intersection of the outer shape of the object A with respect to the center point a0 of the circumscribed circle AO and the position of the intersection of the circumscribed circle AO with respect to the center point a0 thereof.

Similarly, the arc data generation part 14 generates other respective points included in the waveform corresponding to the object A based on the respective intersections of lines a2 to a6 and the outer shape of the object A and the respective intersections of the lines a2 to a6 and the circumscribed circle AO. Thus, the arc data generation part 14 generates an arc-like waveform (referred to as "arc data") corresponding to the object A based on the intersections of the lines of radially extending from the center point a0 of the circumscribed circle AO for 360° and the outer shape of the object A and the intersections of these lines of 360° and the circumscribed circle AO.

Figure 4B:
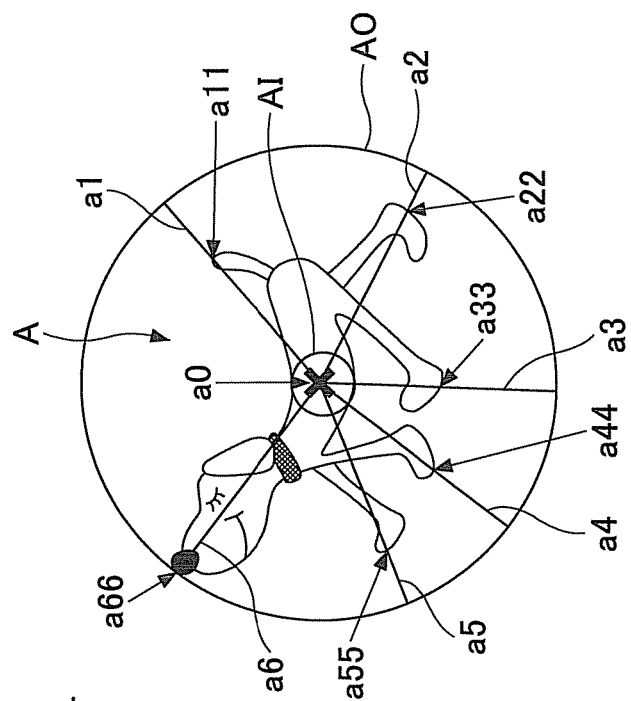
FIGS. 4A and 4B illustrate generation of arc data of a dog according to the first embodiment.
Figure 4A:
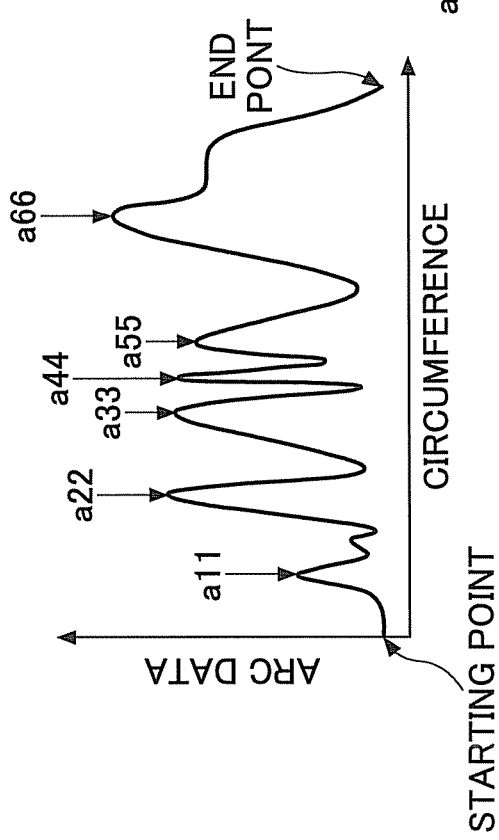

FIGS. 4A and 4B show the arc data of the object A of the entire body of the dog of FIG. 3. The intersections (or contact points) a11, a22, a33, a44, a55 and a66 of the lines a1, a2, a3, a4, a5 and a6 and the outer shape of the object A indicate relatively projecting parts of the outer shape of the object A, and are shown as feature points of the graph of the arc data. It is noted that the abscissa axis of the graph of FIG. 4A denotes positions of the circumscribed circle AO in a circumferential direction, and the ordinate axis denotes the values of the arc data. In the graph of FIG. 4A, the relative positions of the outer shape of the object A with respect to the circumscribed circle AO are analyzed for 360° in the circumferential direction from a starting point ("STARTING POINT") shown in the object A of the entire body of the dog of FIG. 3, and the analysis result is shown as the waveform of FIG. 4A. Thus, the end point is coincident with the starting point.

Thus, the arc data generation part 14 obtains the intersections of the object and the straight lines extending from the center point of the circumscribed circle and the intersections of the circumscribed circle, and generates the arrangement of arcs concerning the object.

The arc data generating part 14 generates the arc-like waveforms for the respective plural objects obtained from the dividing process as mentioned above. In the example of FIG. 3, for the object A, object B and object C, "extraction of inscribed circles"→"setting of circumscribed circles"→"generation of arc data" are carried out, respectively.

The extraction part 15 extracts template candidates corresponding to the thus generated waveforms of the objects from waveforms of plural templates stored in the model database 16.

Figure 5:
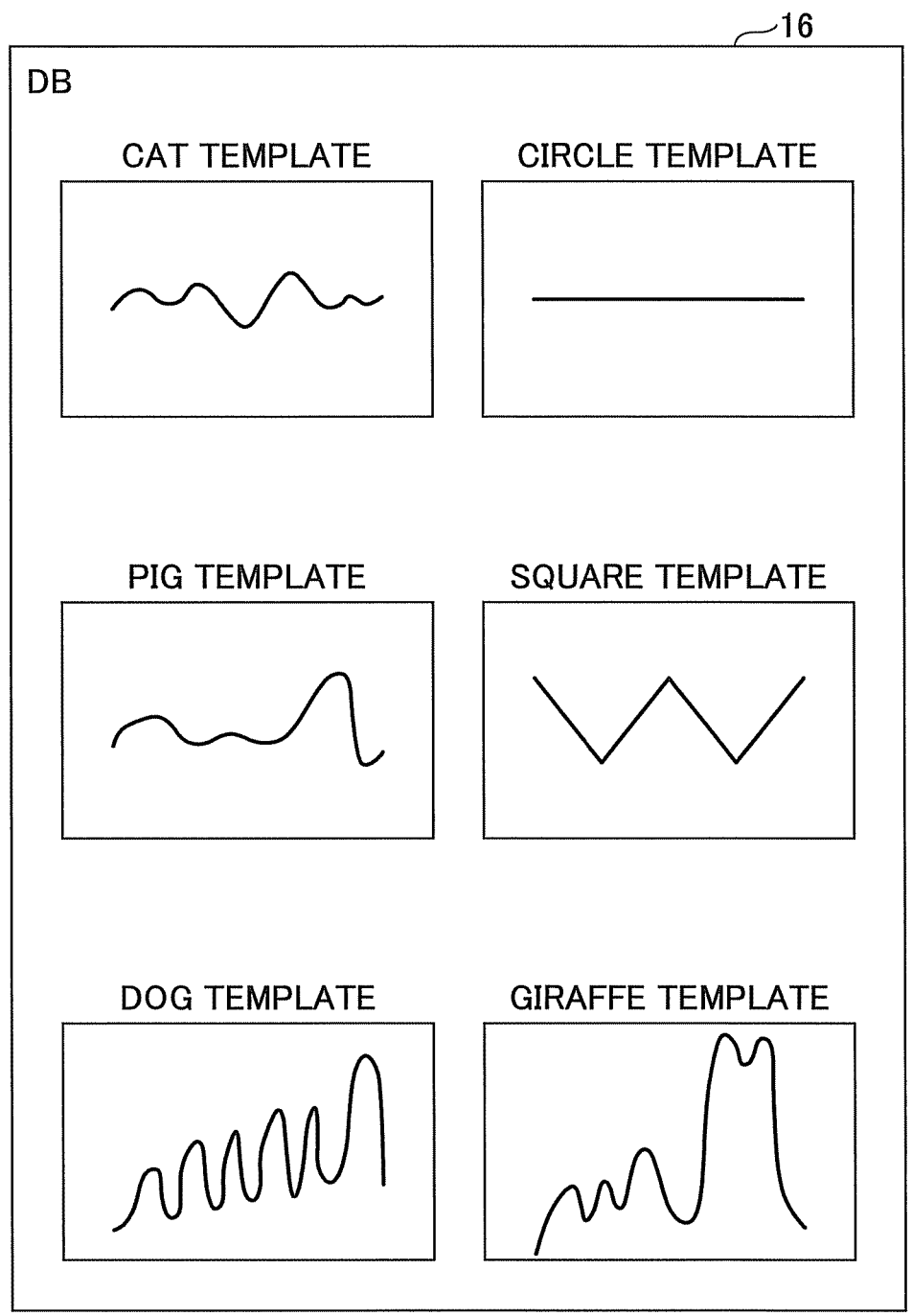
FIG. 5 shows one example of a model database according to the first embodiment.

With the model database 16, waveforms of templates of various objects are previously registered in association with the templates. For example, as shown in FIG. 5, the model database 16 stores the arc data of various templates such as a cat, a pig, a dog, a giraffe, a circle, a square, . . . . The respective templates themselves are stored, in association with the corresponding sets of arc data, in the model database 16 or another storage device inside the image recognition apparatus 1 or another storage device outside the image recognition apparatus 1.

For example, the model database 16 stores the waveforms of basic templates of a "dog" and a "giraffe" as respective sets of arc data. The specific method of generating the waveforms of the templates is the same as that carried out by the above-mentioned arc data generation part 14.

Figure 6:
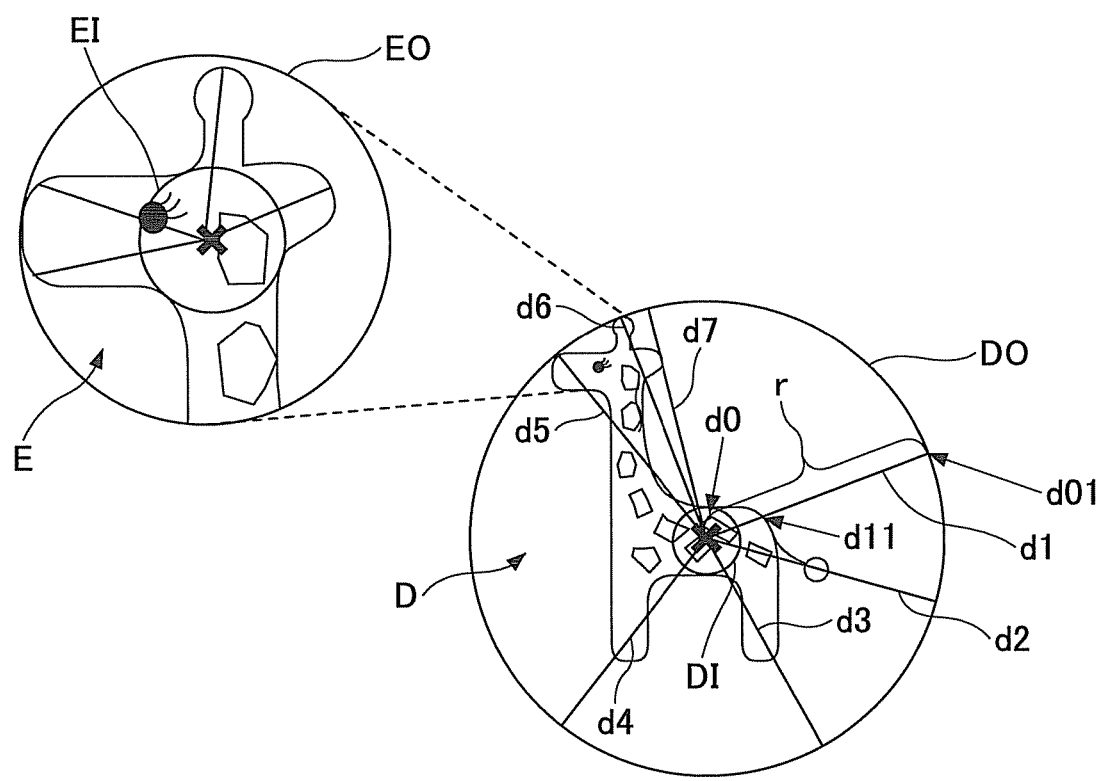
FIG. 6 illustrates setting of a circumscribed circle of a giraffe according to the first embodiment.

A case will be considered where a child has drawn a "dog" shown in FIG. 3 and a giraffe shown in FIG. 6. Then, the arc data generation part 14 of the image recognition apparatus 1 according to the first embodiment generates the arc data of FIG. 4A from the thus obtained "picture of the dog", and generates the arc data of FIG. 7A from the thus obtained "picture of the giraffe".

That is, also for the object of the "picture of the giraffe", the same as the above-mentioned case of the object of the "picture of the dog", the circumscribed circle DO having the center point d0 the same as the center point d0 of the inscribed circle DI of the object D shown in FIG. 6 is produced, and respective ratios between the intersections of lines d1, d2, d3, d4, d5, d6 and d7 radially extending from the center point d0 and the outer shape of the object D and the intersections of the lines d1, d2, d3, d4, d5, d6 and d7 and the circumscribed circle DO are stored as an arrangement. As a result, the arc data thus extracted from the "picture of the giraffe" drawn by the child is obtained as the arc data shown in FIG. 7A. It is noted that in FIG. 6, "r" denotes the radius of the circumscribed circle DO, and "d01" denotes the intersection of the line d1 radially extending from the center point d0 and the circumscribed circle DO. Further, "EO" denotes the circumscribed circle of the object "E" of the face part of the giraffe, and "EI" denotes the inscribed circle of the object "E".

The relative position of the outer shape of the object with respect to the circumscribed circle may be expressed, for example, by respective ratios between the intersections of lines radially extending from the center point of the circumscribed circle and the outer shape of the object and the intersections of the lines and the circumscribed circle. For example, the relative position of the outer shape of the object with respect to the circumscribed circle may be expressed, for example, by the respective ratios between the lengths from the center point of the circumscribed circle to the intersections of the outer shape of the object and the lengths from the intersections of the outer shape of the object to the intersections of the circumscribed circle. Alternatively, the relative position of the outer shape of the object with respect to the circumscribed circle may be expressed, for example, by the respective ratios between the lengths from the center point of the circumscribed circle to the intersections of the outer shape of the object and the lengths from the center point of the circumscribed circle to the intersections of the circumscribed circle. Further alternatively, the relative position of the outer shape of the object with respect to the circumscribed circle may be expressed, for example, by the values obtained from assuming the length of the radius from the center point of the circumscribed circle to the intersections of the circumscribed circle as "1" and standardizing the lengths from the center point of the circumscribed circle to the intersections of the outer shape of the object as the ratios of the lengths with respect to "1".

The thus generated set of arc data of the "picture of the dog" and the thus generated set of arc data of the "picture of the giraffe" are compared with the plural sets of arc data stored in the model database 16.

In the arc data of the "picture of the dog" of FIG. 4A, the face, the limbs and the tail of the dog are indicated as the feature points (a11, a22, a33, a44, a55 and a66). In the arc data of the "picture of the giraffe" of FIG. 7A, the neck, and the face, the horn and the ear at the extending end of the neck of the giraffe are indicated as feature points (d55, d66 and d77).

In contrast thereto, the arc data of the template of the "dog" of FIG. 5 does not have the feature points (d55, d66 and d77) concerning the long neck which the arc data of the "picture of the giraffe" of FIG. 7A has. On the other hand, the arc data of the template of the "giraffe" of FIG. 5 has the feature points which the arc data of the "picture of the giraffe" of FIG. 7A has, and thus, has a similar waveform.

Similarly, the arc data of the template of the "giraffe" of FIG. 5 does not have the feature points (a11, a22, a33, a44, a55 and a66) concerning the face, the limbs and the tail, which the arc data of the "picture of the dot" of FIG. 4A has. On the other hand, the arc data of the template of the "dog" of FIG. 5 has the feature points which the arc data of the "picture of the dog" of FIG. 4A has, and thus, has a similar waveform.

Thus, the arc data of the "dog" of FIG. 4A is recognized to have a resemblance to the arc data of the "dog" of FIG. 5, and the arc data of the "giraffe" of FIG. 7A is recognized to have a resemblance to the arc data of the "giraffe" of FIG. 5.

Thus, by extracting the outer shape of the object as the arc data with respect to the circumscribed circle and comparing the arc data with the arc data of templates, it is possible to carry out image recognition processing at high speed, and also, it is possible to achieve image recognition of the object even when the object is a somewhat deformed object. Further, the feature points to be used for recognizing the object is converted into the arc data that acts as intermediate data, and the comparison is carried out using the intermediate data obtained from the conversion. Thus, the comparison can be carried out regardless of the size of the drawn object with the features of the outer shape of the object that are maintained. Further, by providing a certain amount of threshold for the comparison of the arc data, it is possible to flexibly search the model database 16 based on the overall feature of the entirety of the object even when including some variation such as a position change of a drawn leg, to extract the template(s) to which the arc data has a resemblance from the model database 16 at high speed. It is noted that the extraction part 15 may extract the template candidate(s) corresponding to the waveform of at least any one of the plural objects obtained from the dividing process. However, the extraction part 15 can further narrow the template candidates by extracting the template candidates corresponding to the respective waveforms of all of the objects obtained from the dividing process.

Further, the extraction part 15 can compare the plural templates stored in the model database 16 with the generated waveform of the object in such a manner that any points on the waveforms of these plural templates are used as starting points. As described above, the feature of the object is expressed by the arc-like waveform, and substantially, the waveform does not have any of a starting point and an end point. Thus, it is not necessary to use the starting point of the waveform of the object as a fixed point, when being compared with the templates. The waveform of the object can be compared with the waveforms of the templates in such a manner that any point of the waveform can be used as a starting point from which the comparison will be started. In fact, at a time of reading an image, ordinarily, the image taking direction, the image taking angle and/or the like are not fixed and depend on the particular occasion. Thus, there may be a case where the object is not photographed from its front side and, for example, is photographed from its back side. Even in such a case, the comparison of the waveforms can be made by making the starting point of the object coincident with the starting point of the waveform of the template which expresses the thing approximately from the front side.

When carrying out matching between the waveforms corresponding to the plural templates stored in the model database 16 and the waveform generated by the arc data generation part 14, the extraction part 15 carries out, for example, frequency analysis such as classifying each waveform into high frequency components and low frequency components, and extracts, based on the analysis result, template candidates corresponding to the generated waveform of the object.

As a technique of matching arc data, there is a method of extracting features of the waveforms of two sets of arc data to be compared and determining whether they are coincident. For example, from the waveforms shown in FIGS. 8A, 8C and 8E (corresponding to the templates of FIGS. 8B, 8D and 8F, respectively), positions of peaks and between-peak intermediate positions having small variation may be distinguished therebetween and extracted. Then, high frequency analysis may be carried out on the extracted positions of peaks while low frequency analysis may be carried out on the extracted between-peak intermediate positions.

Figure 8A:
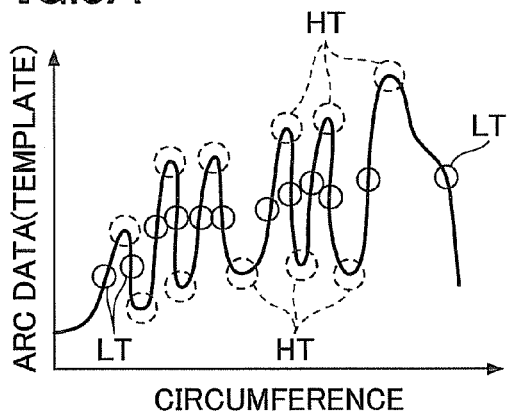
FIGS. 8A to 8F illustrate analysis of arc data according to the first embodiment.
Figure 8B:
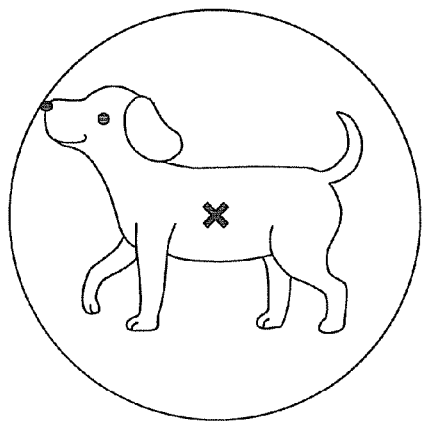
Figure 8C:
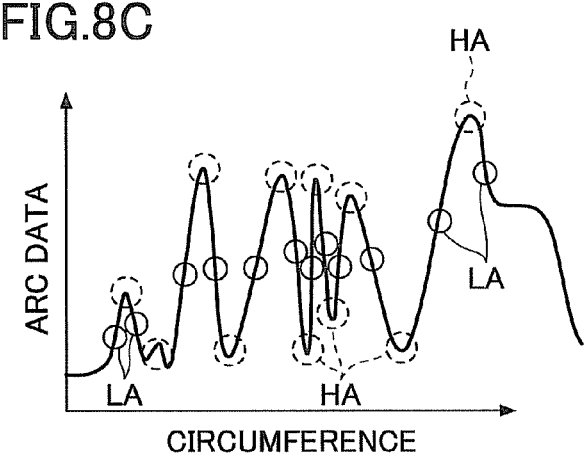
Figure 8D:
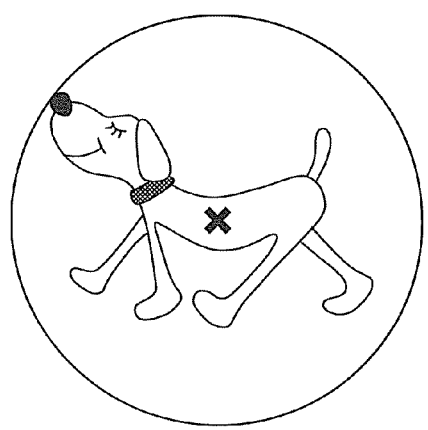
Figure 8E:
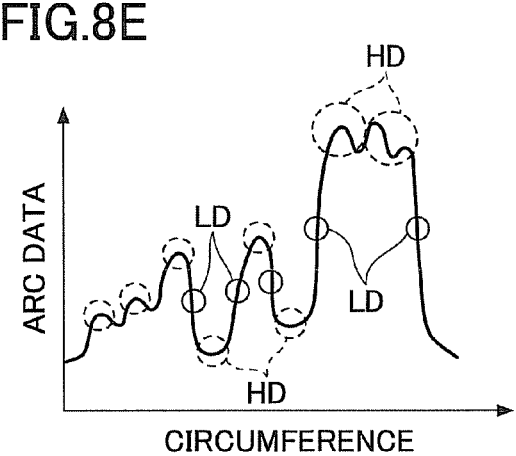
Figure 8F:
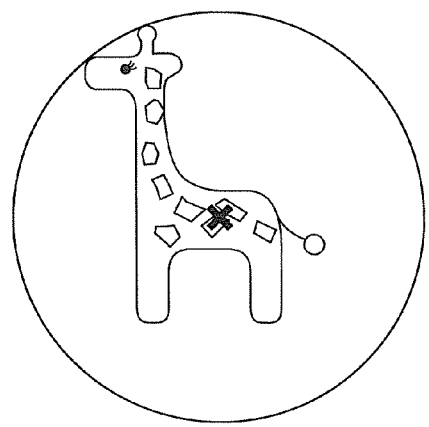

FIG. 8A shows one example of the waveform of the arc data of the template of "dog". FIG. 8C shows the waveform of the arc data of the "picture of the dog" shown in FIG. 4A. FIG. 8E shows the waveform of the arc data of the "picture of the giraffe" shown in FIG. 7A.

According to the above-mentioned analysis method, the high frequency components HT of the waveform of FIG. 8A, the high frequency components HA of the waveform of FIG. 8C and the high frequency components HD of the waveform of FIG. 8E are extracted, and high frequency analysis is carried out. Further, the low frequency components LT of the waveform of FIG. 8A, the low frequency components LA of the waveform of FIG. 8C and the low frequency components LD of the waveform of FIG. 8E are extracted, and low frequency analysis is carried out.

Thereby, it is determined which template has the waveform to which the waveform of the object included in the image that has been read is similar, and template candidates are selected. In the example of FIGS. 8A, 8C and 8E, it is determined that the waveform of the "picture of the dog" of FIG. 8C is similar to the waveform of the template of "dog" of FIG. 8A, and the template of "dog" of FIG. 8A is selected as one template candidate corresponding to the "picture of the dog". On the other hand, it is determined that the waveform of the "picture of the giraffe" of FIG. 8E is not similar to the template of "dog" of FIG. 8A, and the template of "dog" of FIG. 8A is not selected as one template candidate corresponding to the "picture of the giraffe".

Thus, the generated arc data of the object is compared with the arc data of the registered templates, and plural template candidates are extracted from the model database 16 for the object that has been read. For example, the arc data of a simple square has a peak every 91.25 degrees. However, for an object that includes a square as an element, although the extraction part 15 can extract candidate templates, it is not possible to determine one template from the plural candidates.

Figure 9:
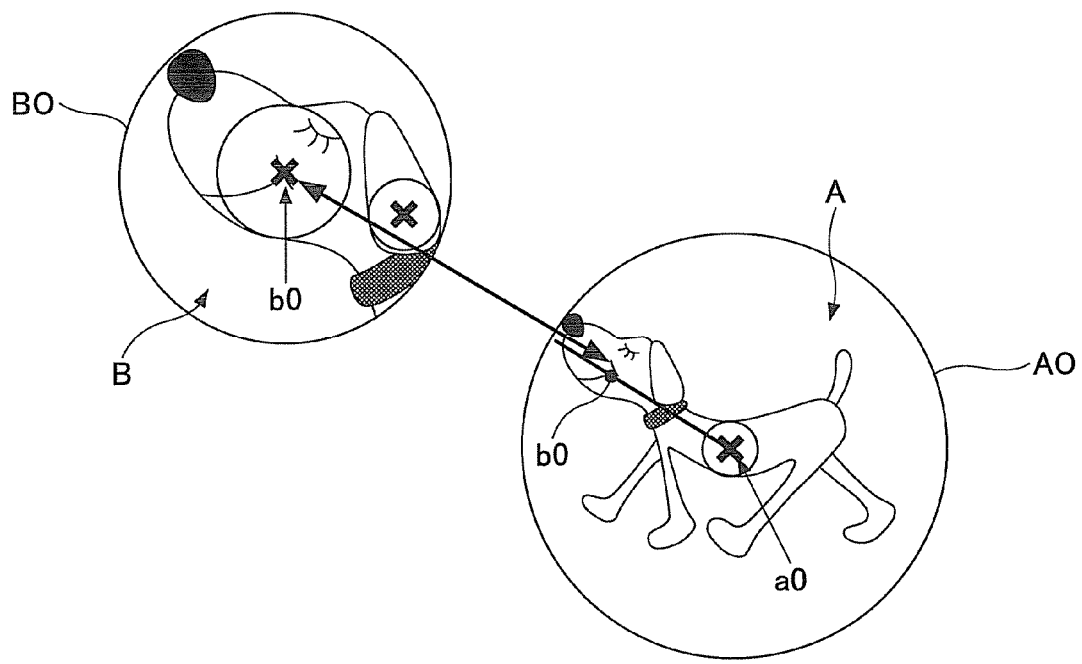
FIG. 9 illustrates a correlation of objects obtained from a dividing process according to the first embodiment.

The determination part 17 narrows the candidates down to the template candidate corresponding to the object included in the image that has been read based on correlation information between the objects obtained from the dividing process. For example, the correlation information is obtained between the objects A and B in the example of FIG. 3. That is, as shown in FIG. 9, the correlation between the circumscribed circle AO of the object A and the center point b0 of the object B is obtained. Then, the correlation information between the circumscribed circle AO of the object A and the center point b0 of the object B is compared with the correlation information of the candidate templates extracted from the model database 16 by the extraction part 15. Thus, it is determined which of the candidate templates corresponds to the "picture of the dog" of FIGS. 3 and 9, and thus, it is determined what is the "picture of the dog" of FIGS. 3 and 9. Thus, according to the first embodiment, the relevancy (correlation) between the plural objects obtained from the dividing process is obtained and stored, and is used to determine what is the object included in the image that has been read (inputted). Thereby, even in a case where the image that has been read (inputted) corresponds to a part of an object, it is possible to determine what is the object when the part has a unique shape. Furthermore, it is possible to narrow down enormous data (template candidate) to a certain extent.

[Image Recognition Processing]

Figure 2:
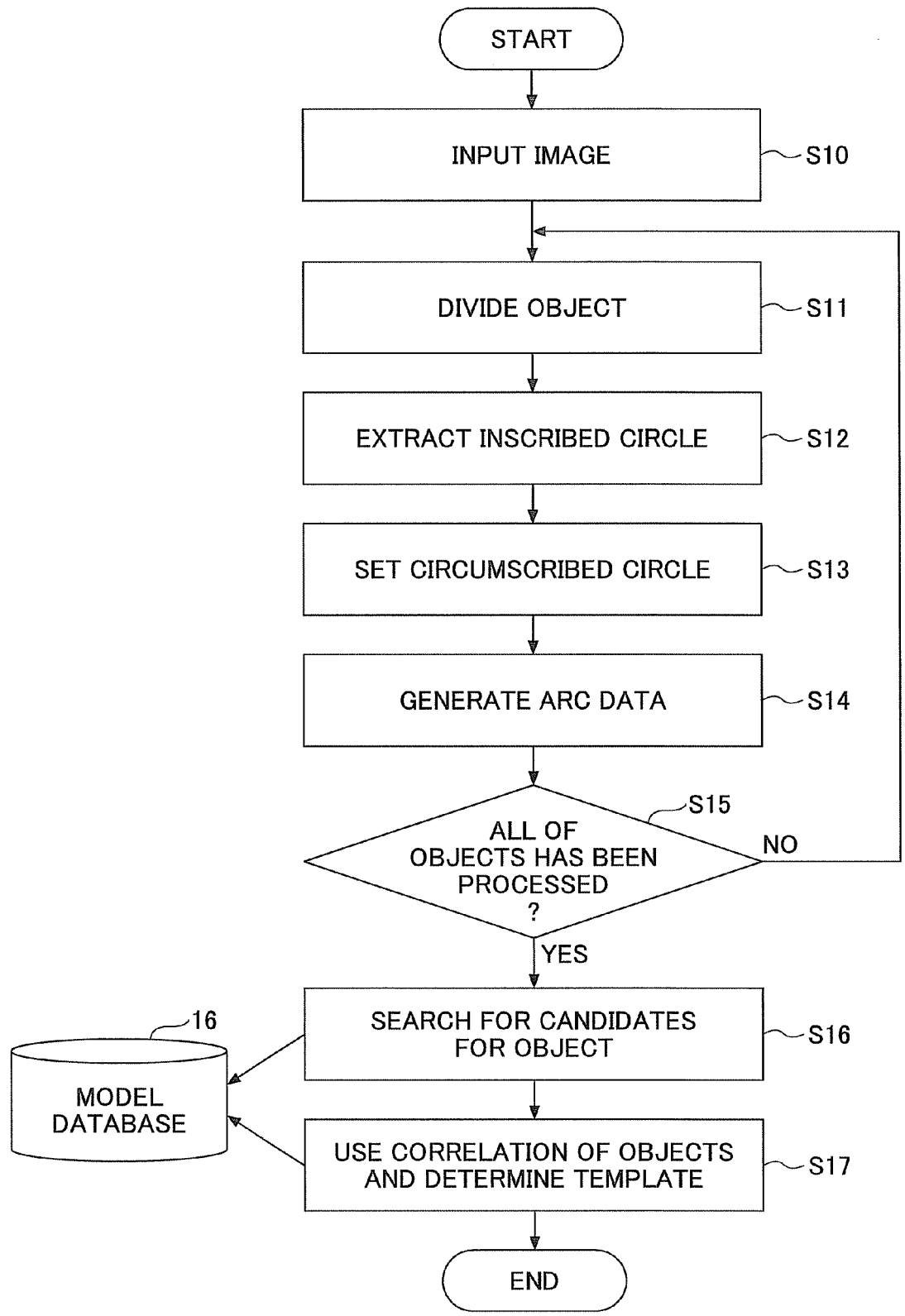
FIG. 2 is a flowchart of an image recognition process according to the first embodiment.

Next, the operations of the image recognition processing carried out by the image recognition apparatus 1 of the first embodiment will be described using FIG. 2.

When the image recognition processing is started by the image recognition apparatus 1, the image reading part 10 (see FIG. 1) inputs an image. Specific example of a method of thus inputting an image include taking an image by a camera, reading an image by a scanner apparatus, receiving an image from the outside, and so forth.

Next, in step S11, the object dividing part 11 extracts an object included in the thus inputted image, and divides the extracted object into plural objects.

Next, in step S12, the inscribed circle extraction part 12 draws inscribed circles that have the largest areas, respectively, for the respective objects obtained from the dividing process carried out in step S11.

Next, in step S13, the circumscribed circle setting part 13 sets circumscribed circles that have the center points which are the same as the center points of the corresponding inscribed circles, which circumscribed circles touch the outermost points of the respective objects.

Next, in step S14, the arc data generation part 14 obtains the intersections of the object and respective straight lines each extending from the center point toward the circumscribed circle and the intersections of the circumscribed circle and the respective straight lines, and thus, generates an arrangement of the arcs (arc data) concerning the object.

Next, in step S15, the extraction part 15 determines whether steps S11 to S14 have been carried out for each of all of the objects obtained from the dividing process of the object dividing part 11. In a case where steps S11 to S14 have not been carried out for each of all of the objects obtained from the dividing process, the process is returned to step S11, and steps S11 to S14 are carried out on the object(s) for which steps S11 to S14 have not been carried out. In a case where steps S11 to S14 have been carried out for each of all of the objects obtained from the dividing process, the process is proceeded to step S16, and the extraction part 15 searches the model database 16 for the template candidates of the objects each similar to the object included in the inputted image. More specifically, the extraction part 15 searches the model database 16 for the template candidates having the arc data similar to the arc data generated in step S14 of each of the objects obtained from the dividing process of step S11.

Next, in step S17, the determination part 17 compares the correlation information of the objects included in those obtained from the dividing process of step S11 and overlapping one another with the corresponding correlation information of the template candidates obtained in step S16. As described above, the correlation information is, for example, information indicating relevancy (correlation) between the circumscribed circle of one of the objects and the center point of another of the objects. The relevancy (correlation) between the circumscribed circle of one of the objects and the center point of another of the objects may be, for example, positional relationship between the circumscribed circle of one of the objects and the center point of another of the objects. The positional relationship between the circumscribed circle of one of the objects and the center point of another of the objects may be, for example, the ratio between the minimum distance and the maximum distance between the circumscribed circle of one (first object) of the objects and the center point of another (second object) of the objects. The minimum distance means the distance between the center point of the second object and the nearest point included in the circumference of the circumscribed circle of the first object. Similarly, the maximum distance means the distance between the center point of the second object and the farthest point included in the circumference of the circumscribed circle of the first object.

In step S17, thus, the determination part 17 compares the correlation information of the objects obtained from the dividing process of step S11 with the correlation information of the template candidates obtained in step S16. Thus, the determination part 17 narrows the template candidates down into the template candidate corresponding to the object included in the inputted image to determine what is the object included in the inputted image.

Thus, according to the first embodiment, the relevancy (correlation) between the plural objects obtained from the dividing process is used. As a result, even in a case where the inputted image merely includes a part of an object, it is possible to determine what is the part, when the part has a unique shape, and it is possible to narrow enormous data (template candidates) down to a certain extent.

Thus, according to the image recognition apparatus 1 of the first embodiment, an inscribed circle is extracted which has the maximum area from among inscribed circles of an object of an inputted image. Then, a circumscribed circle is drawn which has the center point that is the same as the center point of the inscribed circle and touches the outermost point of the object. Then, arc-like feature data (arc data) is extracted as a waveform which indicates the relative position of the outer shape of the object with respect to the circumscribed circle.

Thus, the overall feature of the entirety of the outer shape of the object is converted into the waveform, and the thus obtained waveform is compared with the waveforms of the templates previously registered with the model database 16 which have been previously obtained from the conversion in the same way. Therefore, even in a case where the object included in the inputted image (image that has been read) is somewhat deformed such as a picture handwritten by a child, it is possible to carry out image recognition of the object with a high degree of accuracy, and it is possible to accurately narrow down the template candidates corresponding to the object, by comparing the waveform indicating the overall feature of the entirety of the outer shape of the object with the waveforms of the templates.

Especially, according to the first embodiment, the feature of the object is indicated as a ratio of the position of the outer shape of the object with respect to the circumscribed circle. Thus, it is possible to compare the waveform of the object with the waveforms of the templates without regard to the size of the object which has been actually drawn.

Second Embodiment

[Entire Configuration of Image Recognition Apparatus]

Figure 10:
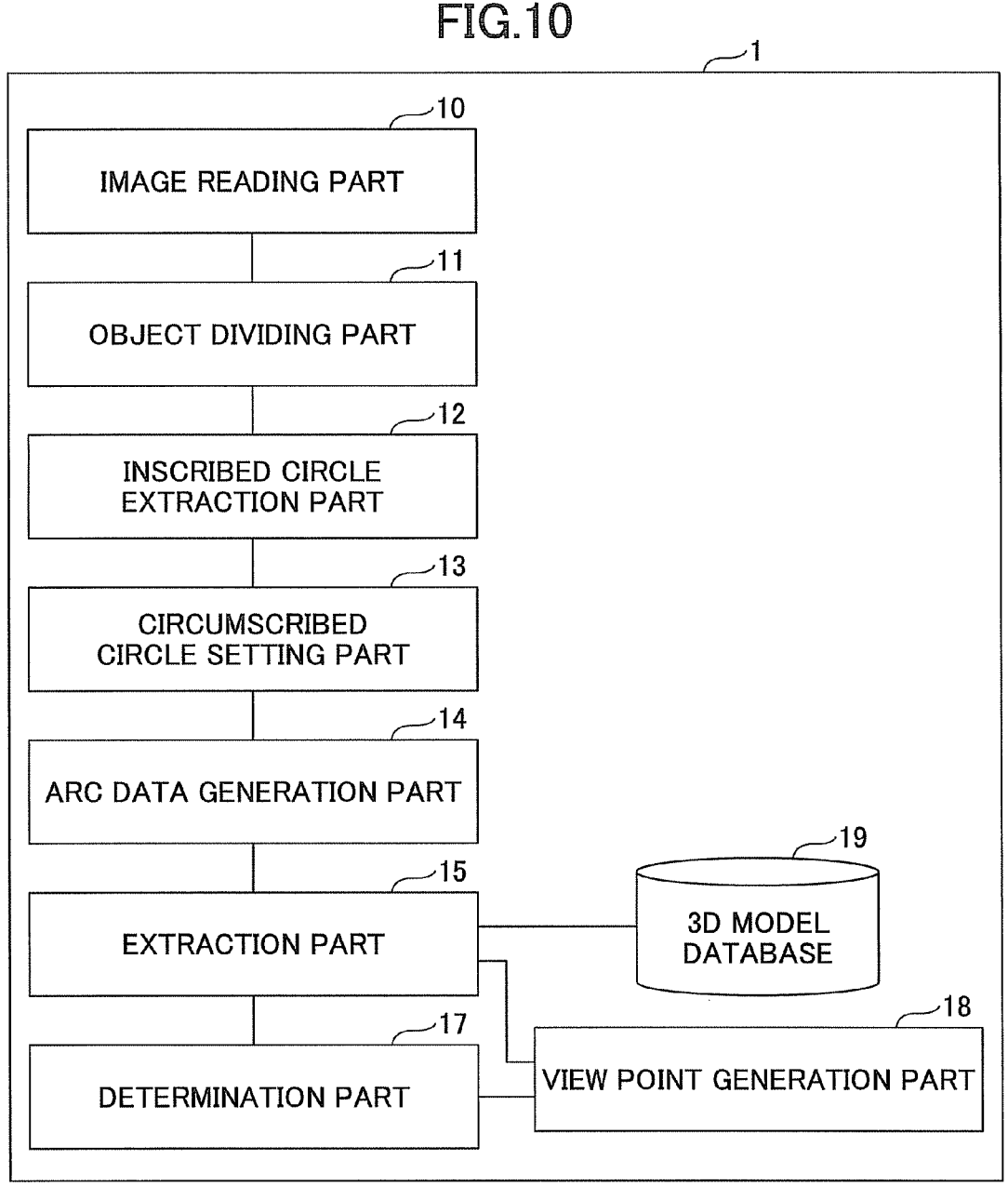
FIG. 10 is a functional configuration diagram of an image recognition apparatus according to a second embodiment.

Next, the image recognition apparatus according to the second embodiment will be described using FIG. 10. FIG. 10 is a functional configuration diagram of the image recognition apparatus according to the second embodiment.

According to the image recognition apparatus 1 of the first embodiment described above, image recognition processing is carried out assuming that the object and the templates are two-dimensional data. In contrast thereto, the image recognition apparatus 1 of the second embodiment can carry out image recognition processing based on three-dimensional data.

The image processing apparatus 1 according to the second embodiment has a view point generation part 18 in addition to the configuration of the image processing apparatus 1 according to the first embodiment. Further, according to the second embodiment, a three-dimensional model database 19 is used. The three-dimensional model database 19 has, as the waveforms of the templates, three-dimensional data in addition to two-dimensional data.

Figure 12:
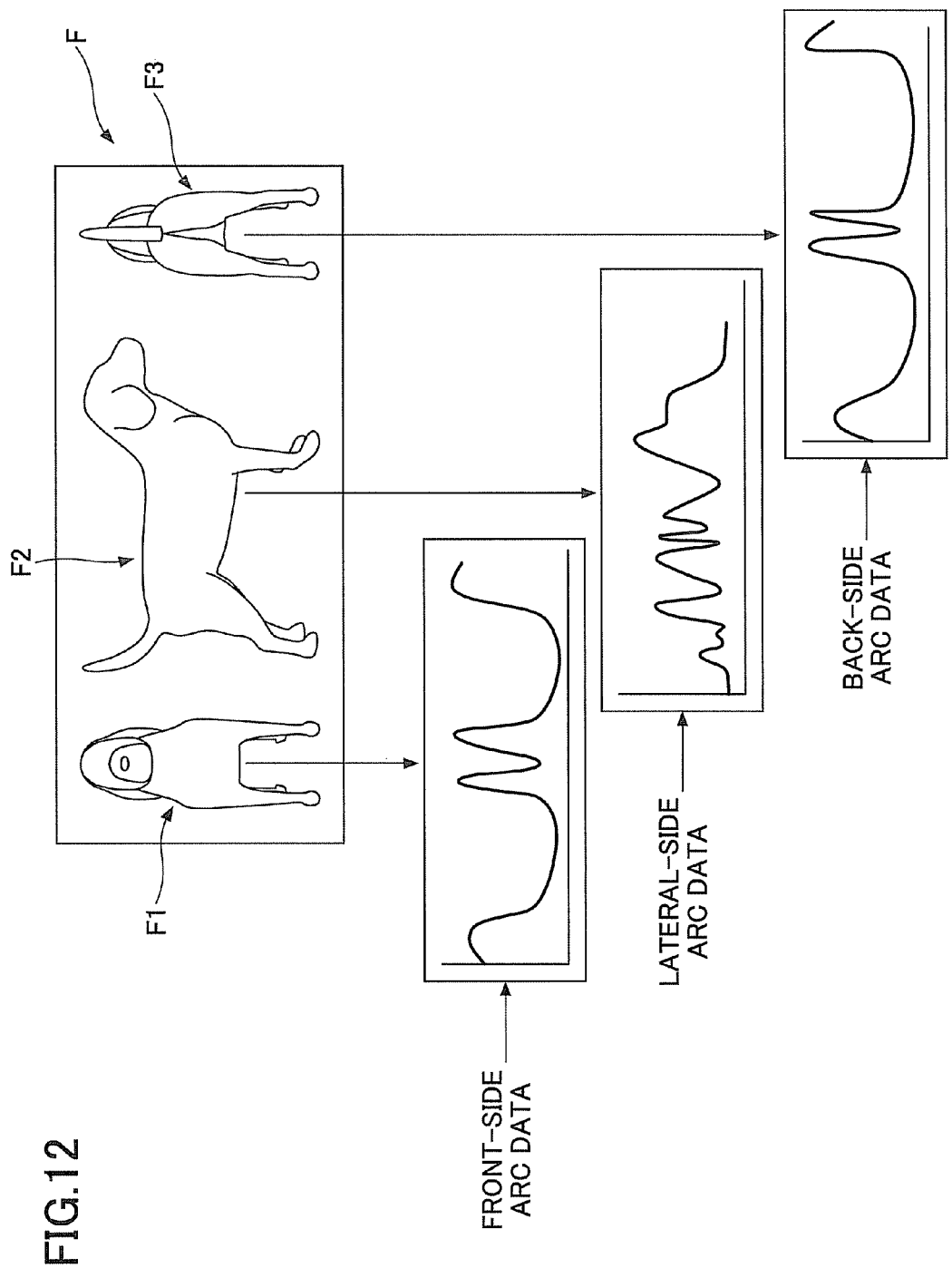
FIG. 12 illustrates generation of arc data according to the second embodiment.

As one example, a template F of a dog included in the three-dimensional model database 19 shown in FIG. 12 has a front-side template F1, a lateral-side template F2 and a back-side template F3. Further, the three-dimensional model database 19 has front-side arc data corresponding to the front-side template F1, lateral-side arc data corresponding to the lateral-side template F2 and back-side arc data corresponding to the back-side template F3. These sets of arc data are those all indicating the outer shape of the template F of the "dog" in the form of arc data of plural view points (in this example, three view points).

[Image Recognition Processing]

Figure 11:
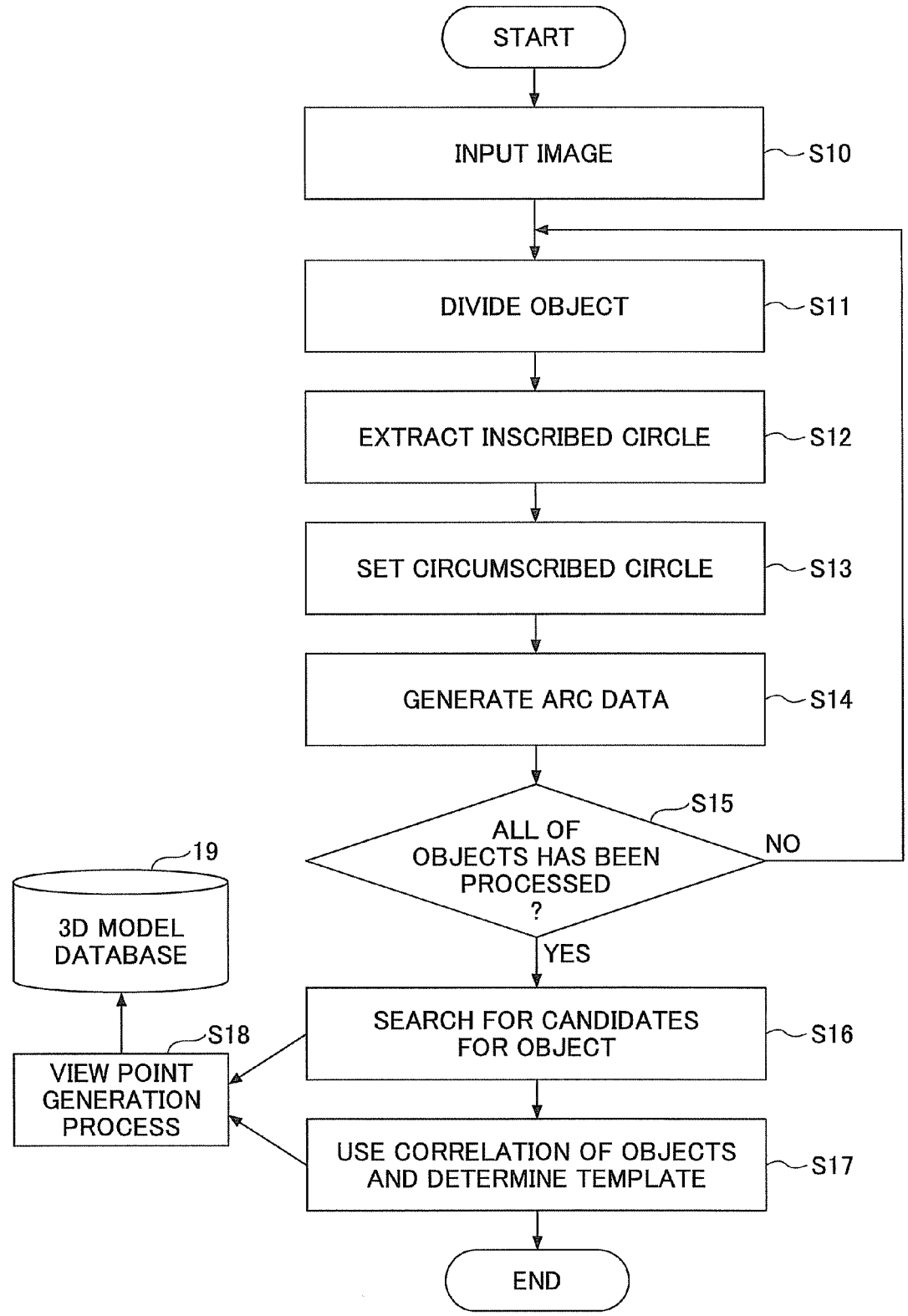
FIG. 11 is a flowchart of an image recognition process according to the second embodiment.

Next, the operations of the image recognition processing carried out by the image recognition apparatus 1 of the second embodiment will be described using FIG. 11.

When the image recognition processing has been started by the image recognition apparatus 1, the image reading part 10 (see FIG. 10) inputs an image. The image is read from plural view points, for example. In this example, respective images of a front side, a lateral side and a back side are read including an object that is a "dog".

Next, in step S11, the object dividing part 11 extracts an object included in the thus inputted image, and divides the extracted object into plural objects. The dividing process is carried out for each one of the objects of the plural respective view points.

Next, in step S12, the inscribed circle extraction part 12 draws inscribed circles that have the largest areas, respectively, for the respective objects obtained from the dividing process carried out in step S11 of each of the plural view points.

Next, in step S13, the circumscribed circle setting part 13 sets circumscribed circles that have the center points which are the same as the center points of the corresponding inscribed circles, which circumscribed circles touch the outermost points of the respective objects of each of the plural respective view points.

Next, in step S14, the arc data generation part 14 extracts the arc-like feature data indicating the relative position of the object with respect to the circumscribed circle, and generates the corresponding waveform (arc data).

Next, in step S15, the extraction part 15 determines whether steps S11 to S14 have been carried out for each of all of the objects obtained from the dividing process of the object dividing part 11 of each of the plural respective view points. In a case where steps S11 to S14 have not been carried out for each of all of the objects obtained from the dividing process of each of the plural respective view points, the process is returned to step S11, and steps S11 to S14 are carried out on the object(s) for which steps S11 to S14 have not been carried out. In a case where steps S11 to S14 have been carried out for each of all of the objects obtained from the dividing process of each of the plural respective view points, the process is proceeded to step S16, and the extraction part 15 searches the three-dimensional model database 19 for the template candidates of the objects each similar to the object included in the inputted image. More specifically, the extraction part 15 searches the three-dimensional model database 19 for the template candidates having the arc data similar to the arc data generated in step S14 of each of the objects obtained from the dividing process of step S11 of each of the plural respective view points.

Further, when the three-dimensional model data such as that shown in FIG. 12 stored in the three-dimensional model database 19 is used in step S16 described above (or step S17 described later), a view point generation process of step S18 can be used. In this case, under the control of the view point generation part 18, based on the three-dimensional image that is inputted in step S10, the object of one view point is processed in steps S11 to S16, the arc data of the object of the view point is generated in a real-time manner in step S14, and the template candidates are searched for from the three-dimensional mode database 19 in step S16. Then, in step S18, under the control of the view point generation part 18, the same process is carried out on the object of another view point based on the three-dimensional image that is inputted in step S10. This process is repeated until the process has been carried out for each of all of the view points. Thus, through the view point generation process of the step S18, the arc data is generated in a real-time manner from the three-dimensional data of the three-dimensional image of the object included in the inputted image.

Next, in step S17, the determination part 17 compares the correlation information of the objects of those obtained from the dividing process of step S11, which overlap one another, of each of the plural respective view points with the correlation information of each of the template candidates obtained in step S16. As described above, the correlation information is, for example, information indicating relevancy (correlation) between the circumscribed circle of one of the objects and the center point of another of the objects. The relevancy (correlation) between the circumscribed circle of one of the objects and the center point of another of the objects may be, for example, positional relationship between the circumscribed circle of one of the objects and the center point of another of the objects. The positional relationship between the circumscribed circle of one of the objects and the center point of another of the objects may be, for example, the ratio between the minimum distance and the maximum distance between the circumscribed circle of one (first object) of the objects and the center point of another (second object) of the objects. The minimum distance means the distance between the center point of the second object and the nearest point included in the circumference of the circumscribed circle of the first object. Similarly, the maximum distance means the distance between the center point of the second object and the farthest point included in the circumference of the circumscribed circle of the first object.

In step S17, for each of the plural view points, the determination part 17 compares the correlation information of the objects obtained from the dividing process of step S11 with the correlation information of each of the template candidates obtained in step S16. Then, the determination part 17 narrows the template candidates down into the template candidate corresponding to the object included in the inputted image to determine what is the object included in the inputted image.

According to the second embodiment, the search for the template candidates in step S16 may be carried out in an overall manner throughout the respective view points. The determination of the template corresponding to the object included in the inputted image in step S17 may also be carried out in an overall manner throughout the respective view points. Thus, it is possible to more accurately narrow down the template candidates into one corresponding to the object included in the inputted image.

Thus, also according to the second embodiment, the relevancy (correlation) between the plural objects obtained from the dividing process is used. As a result, even in a case where the inputted image includes a part of an object, it is possible to determine what is the part is, when the part has a unique shape, and it is possible to narrow enormous data (template candidates) down to a certain extent.

Thus, according to the image recognition apparatus 1 of the second embodiment, the overall feature of the entirety of the outer shape of the three-dimensional object is converted into the respective waveforms, and the thus obtained waveforms are compared with the waveforms of the three-dimensional templates previously obtained from the conversion and registered with the three-dimensional model database 19, respectively. Therefore, it is possible to carry out image recognition of the object with a further higher degree of accuracy, and it is possible to accurately narrow down the template candidates corresponding to the object or accurately select the proper template corresponding to the object, by comparing the waveforms indicating the overall feature of the entire outer shape of the three-dimensional object with the waveforms of the three-dimensional templates.

It is noted that according to the second embodiment, the three-dimensional model database 19 has the three-dimensional data corresponding to the three-dimensional model of front side, a lateral aside and a back side. However, the three-dimensional model database 19 is not limited thereto, and may have arc data for plural view points other than these three view points. Thereby, it is possible to carry out image recognition also for an object included in a video image photographed from various angles.

Application Examples

Next, examples of applications (software) utilizing the image recognition processing according to the above-described first embodiment will be described.

Figure 13:
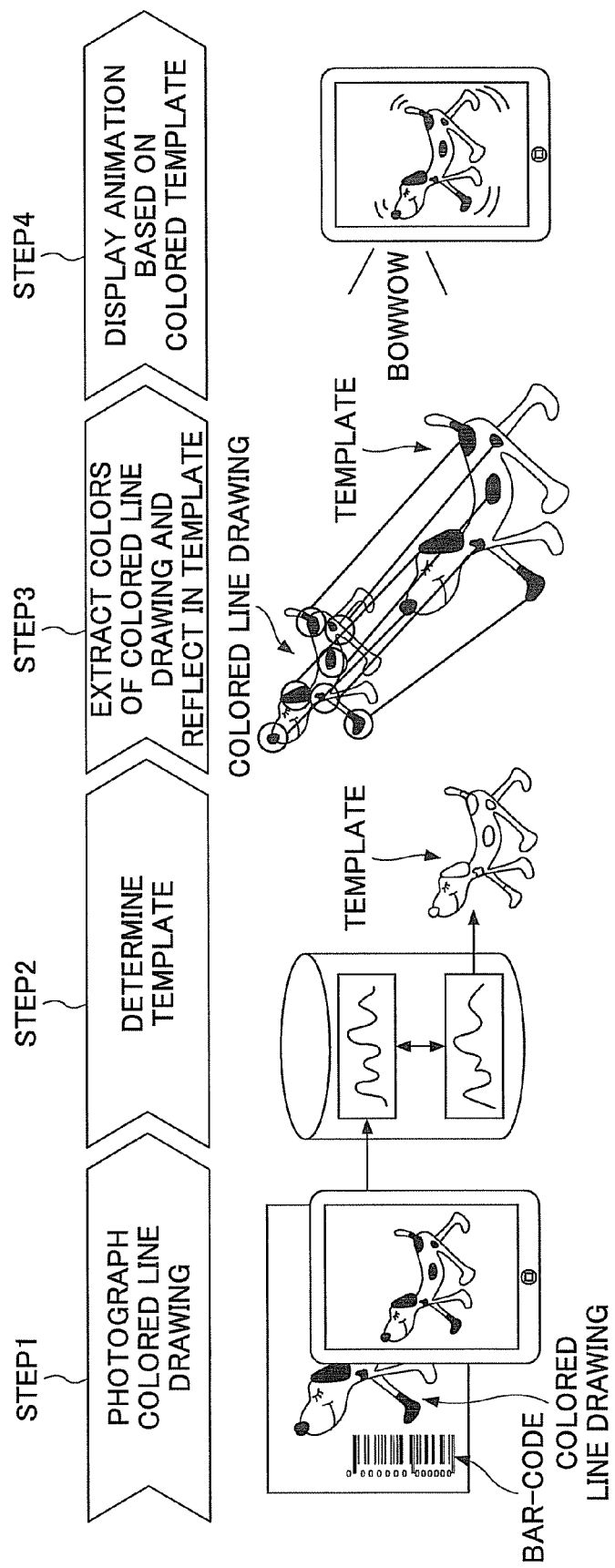
FIGS. 13, 14 and 15 show examples of applications (software) utilizing the image recognition process according to the first embodiment.

[Example of Application of FIG. 13]

First, an example of FIG. 13 will be described.

In the example of FIG. 13, in step STEP1, a colored line drawing drawn by a child is photographed by a portable telephone.

In step STEP2, the image recognition apparatus 1 according to the first embodiment, for example, included in the portable telephone, generates the waveform of the object included in the image that has been thus read, and compares the generated waveform with the waveforms of the templates. Thus, the image recognition processing is carried out on the object, i.e., the photographed colored line drawing; the waveform of the object is compared with the waveforms of the templates; and the template candidates are selected. In a case where the plural template candidates are thus obtained, the plural template candidates may be displayed on a screen of the portable telephone, and the user of the portable telephone may select a desired template therefrom. Thus, the template corresponding to the photographed colored line drawing is obtained.

In step STEP3, the colors used in the photographed colored line drawing are extracted, and the extracted colors are reflected in the template obtained from step STEP2.

The reflecting of the colors in the template may be carried out as follows. For example, the object of, for example, a dog, is divided into plural objects (for example, legs, a body and so forth) by the above-mentioned dividing process or the like. Then, for each of the thus obtained plural objects, the colors obtained from the image that has been read can be reflected in the template.

In step STEP4, a motion generation process is carried out for moving the template in which the colors have been reflected in step STEP3 to produce an animation based on the template, and thus, the template is moved on the screen of the portable telephone as the animation. At this time, a sound may also be provided together with the animation. Thus the application becomes more attractive.

According to the application of FIG. 13, an object included in an image of a colored line drawing is converted into the waveform of arc data (digital data), matching is carried out between the thus obtained waveform and the waveforms of the templates, the template similar to the object is selected from the database, the selected template (contents) is colored with the colors of the colored line drawing, and the thus colored template is moved on the screen as an animation. Thus, according to the application, the digital contents are produced from the colored line drawing, and thus, the drawn picture is made to move on the screen as a video image. Therefore, the child who has colored the line drawing to obtain the colored line drawing can feel affinity to and enjoy with the video image in which the colored line drawing that the child himself or herself has created is moving and barking as if the colored line drawing has jumped out from the paper into the screen.

It is noted that when the colored line drawing of the child is photographed by the portable telephone, information such as a bar-code may be attached aside of the colored line drawing on the paper. In this case, the image obtained from the photographing of the colored line drawing by the portable telephone includes the bar-code information in addition to the object itself. By previously embedding information concerning the object in the bar-code information, it is possible to determine the template in step STEP2 using the comparison result using the arc data, and the bar-code information. Thus, it is possible to select the template more similar to the object more accurately.

Figure 14:
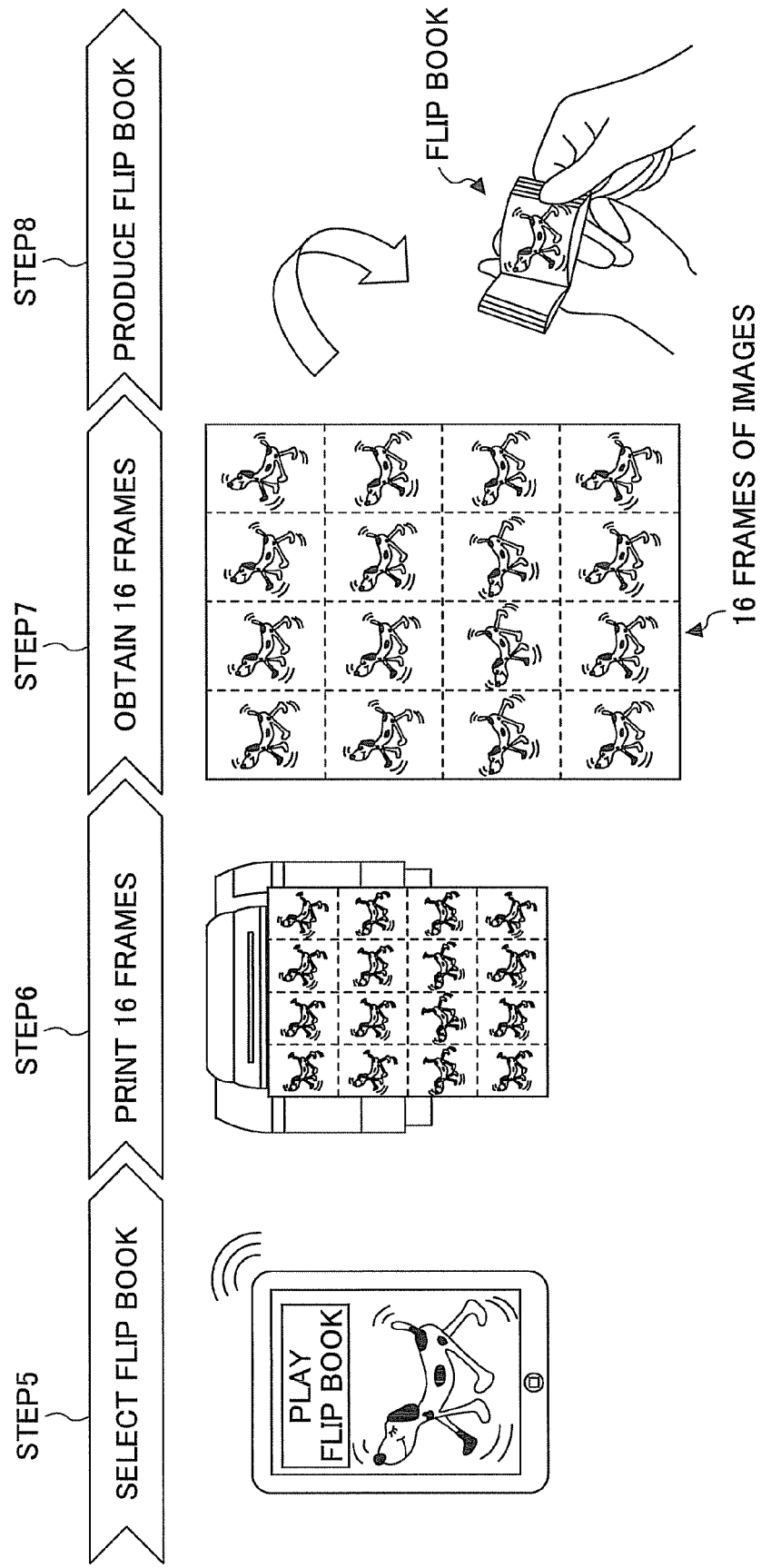
Figure 15:
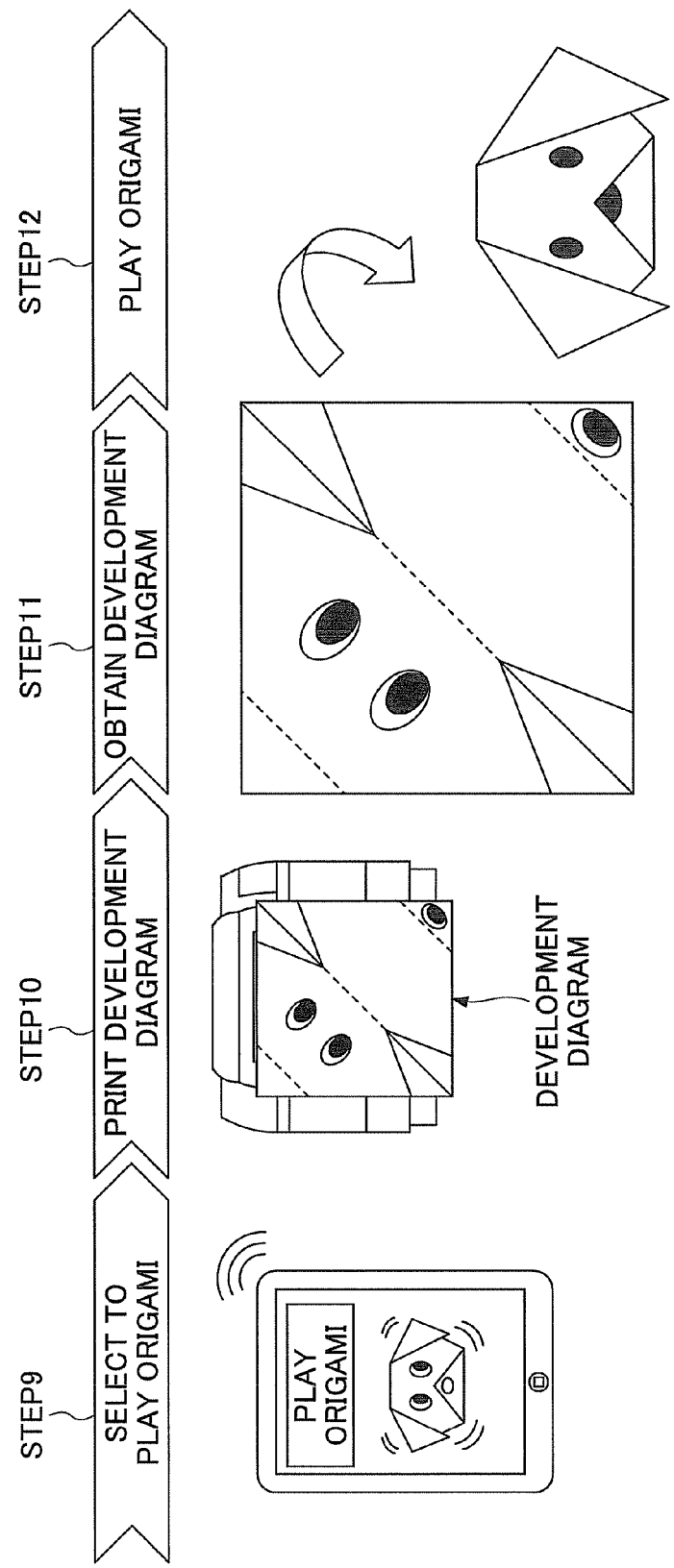

Other applications (software) may be provided which, in respective manners shown in FIG. 14 or FIG. 15, utilize the template completed in step STEP3 of FIG. 13 in which the colors used in the colored line drawing are reflected.

[Example of Application of FIG. 14]

In an example of an application of FIG. 14, the operation flow is "step STEP1 (FIG. 13)→step STEP2 (FIG. 13)→step STEP3 (FIG. 13)→step STEP5 (FIG. 14)→step STEP6 (FIG. 14)→step STEP7 (FIG. 14)→step STEP8 (FIG. 14)".

Steps STEP1 to STEP3 are the same as those described above using FIG. 13.

In step STEP5, the user of the portable telephone presses an execution button for "PLAY FLIP BOOK" on a selection screen displayed on the portable telephone. Also, the user can select a desired one from among plural templates each of which may be one corresponding to the above-mentioned template in which the colors used in the colored line drawing are reflected in step STEP3 of FIG. 13, or the like. The user can thus select the desired template including a desired character (a dog or the like).

When the execution button for "PLAY FLIP BOOK" has been thus pressed in step STEP5, 16 frames of images are printed by a MFP or a printer for home use 2 (see FIG. 16, described later) using the template in which the colors used in the colored line drawing are reflected in step STEP3 of FIG. 13, or the like. For example, in a case where the template in which the colors used in the colored line drawing are reflected corresponds to a "dog", the 16 frames of images that will provide a motion like the dog's walking are transmitted to the printer 2 or the like from the portable telephone.

As the above-mentioned 16 frames of images, the above-mentioned model database 16 may previously have plural similar objects (in this example, 16 similar objects) for each of the templates, for example, the template of a "dog". The plural similar objects thus prepared for the template of the "dog" are those of the same type (i.e., of the dog), and have the shapes slightly different therebetween. Then, printing data of the plural similar objects in which the colors of the colored line drawing are reflected is transmitted to the printer 2 or the like, which then prints the plural similar objects. Then, the user can produce a flip book using the sheet of paper on which the plural similar objects have been printed.

As mentioned above, the object of, for example, the dog, is divided into plural objects (for example, legs, a body and so forth) by the above-mentioned dividing process, for example. Then, for each of the thus obtained plural objects, the colors extracted from the image that has been read are reflected in each of these plural similar objects. As mentioned above, the plural similar objects have the shapes slightly different. However, it is possible to reflect the colors in the plural similar objects while the visibility among the plural similar objects can be maintained, and thus, the flip book can provide a smooth motion of the object (the dog in the example of FIG. 14) to the eyes of the viewer. For this purpose, the colors are reflected in the plural similar objects in such a manner that the color distribution is made to be the same among the plural similar objects for each of the plural objects obtained by the dividing process.

Thus, according to the application (software) of the example of FIG. 14, the image recognition apparatus 1 (included in the portable phone in the above-mentioned example) includes a reception part (10, see FIG. 16) that receives an image that has been read; a determination part (17) that determines a registered object to correspond to an object included in the received image that has been read from among previously registered plural objects; a reflecting part (21) that reflects colors of the image that has been read in previously stored plural similar objects each similar to the registered object determined by the determination part; and a printing control part (22) that causes a printing apparatus (2) to print the plural similar objects in which the colors have been reflected by the reflecting part (21).

Returning to the description of FIG. 14, in steps STEP6 and STEP7, the printer 2 or the like prints the 16 frames of images for the flip book on a sheet of paper.

In step STEP8, the user cuts the sheet of paper on which the 16 frames of images have been thus printed as shown in FIG. 14 ("16 FRAMES OF IMAGES") into the respective 16 pages. Then, the user forms the flip book by binding these 16 pages, as shown in FIG. 14 ("FLIP BOOK"), and can enjoy it.

Figure 16:
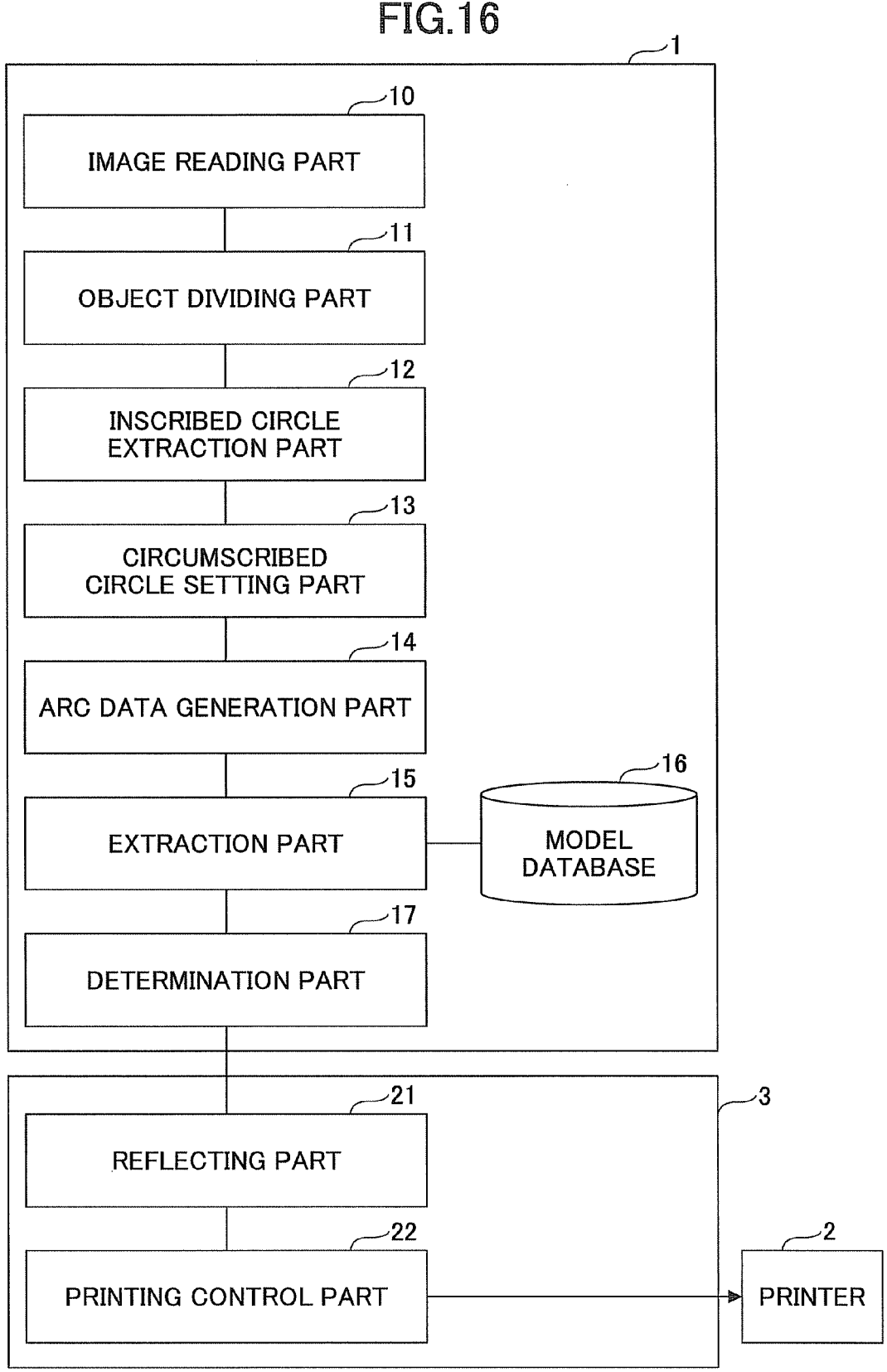
FIG. 16 shows an example of a system configuration of the example of the application (software) concerning FIG. 14.

FIG. 16 shows an example of a system configuration of the above-described example of the application (software) of FIG. 14 using the image recognition apparatus 1 of the first embodiment.

The system includes the image recognition apparatus 1 according to the first embodiment, the application (software) 3 and the printer 2 or the like.

The application 3 includes the reflecting part 21 and the printing control part 22.

In this regard, it is noted that the image recognition apparatus 1 includes a CPU 51 as will be described using FIG. 17. The CPU 51 executes an image recognition program to realize the respective functional parts 10 to 17, and also, executes the application 3 to realize the respective functional parts 21 to 22.

The reflecting part 21 reflects, in step STEP3 of FIG. 13, the colors used in the colored line drawing that is read by the image reading part 10 in step STEP1, in the plural similar objects corresponding to the template determined by the determination part 17 in step STEP2.

The printing control part 22 transmits the printing data of the 16 frames of images corresponding to the plural similar objects, respectively, in which the colors used in the colored line drawing is reflected by the reflecting part 21 in step STEP3, to the printer 2 or the like in step S5 of FIG. 14.

[Example of Application of FIG. 15]

Next, the example of FIG. 15 will be described.

In the example of FIG. 15, the operation flow is "step STEP1 (FIG. 13)→step STEP2 (FIG. 13)→step STEP3 (FIG. 13)→step STEP9 (FIG. 15)→step STEP10 (FIG. 15)→step STEP11 (FIG. 15)→step STEP12 (FIG. 15)".

The steps STEP1 to STEP3 are the same as those described above using FIG. 13.

In step STEP9, the user of the portable telephone presses an execution button for "PLAY ORIGAMI" on a selection screen displayed on the portable telephone. Also, the user can select a desired one from among plural templates each of which may be one corresponding to the above-mentioned template in which the colors used in the colored line drawing are reflected in step STEP3 of FIG. 13, or the like. The user can thus select the desired template corresponding to a desired character (a dog or the like). By thus selecting the template of the character corresponding to the colored line drawing colored by himself or herself, it is possible to obtain the origami that has been colored at the same positions as those of the colored line drawing colored by himself or herself.

After the execution button for "PLAY ORIGAMI" has been thus pressed in step STEP9, a development diagram is printed in steps STEP10 and STEP11 by a MFP or a printer for home use using the template in which the colors used in the colored line drawing are reflected in step STEP3 of FIG. 13. For example, in a case where the template in which the colors used in the colored line drawing are reflected corresponds to a "dog", the development diagram of the dog's in which the colors used in the colored line drawing are reflected is printed on a sheet of paper for the origami.

In step STEP12, the user can enjoy the origami using the development diagram thus completed on the sheet of paper.

Thus, by utilizing the image recognition apparatus 1 according to the first embodiment, it is possible to provide the attractive applications (software) to users. That is, by photographing a sheet of paper on which an object to carry out image recognition has been drawn by a camera, the image recognition apparatus 1 digitally takes in the object, carries out matching between the taken in object and the templates, and selects the template similar to the object. Then, it is possible to provide the applications (software) by which desired image processing may be carried out on the thus selected template.

Figure 17:
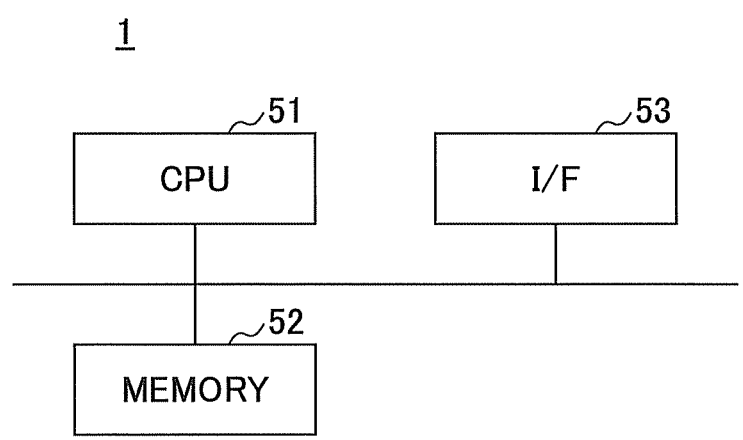
FIG. 17 shows a block diagram of the image recognition apparatus according to the first or second embodiment.

It is noted that the image recognition apparatus 1 according to each of the first and second embodiments includes the CPU 51 and the memory 52 shown in FIG. 17. The image recognition programs and/or the applications (software) for realizing the respective functions described above using FIGS. 1 to 16 to be executed by the CPU 51 may be previously stored in the memory 52 (storage part) such as a ROM, a HDD or the like. Alternatively, the image recognition programs and/or the applications (software) may be previously stored in the memory 52 (storage part) such as a portable non-volatile recording medium (recording medium) such as a CD-ROM, a flexible disk, a SRAM, an EEPROM, a memory card or the like. The functions of the image recognition apparatuses 1 and/or the applications (software) are realized as a result of the CPU 51 executing the image recognition programs and/or the applications (software) stored in the memory 52. Attentively, the image recognition programs and/or the applications (software) may be downloaded from an external apparatus provided with a recording medium storing the image recognition programs and/or the applications (software), or an external apparatus including a storage part storing the image recognition programs and/or the applications (software) via a communication network and an interface (I/F) 53.

Thus, according to the embodiments, it is possible to recognize an image of an object included in an image that has been read.

The image recognition apparatus and the image recognition method have been described by the embodiments. However, the present invention is not limited to these specifically disclosed embodiments, and variations and modifications may be made without departing from the scope of the present invention.

The present application is based on and claims the benefit of priority to Japanese Priority Application No. 2012-128876, filed on Jun. 6, 2012, the entire contents of which are hereby incorporated herein by reference.

What is claimed is:

1. An image recognition apparatus comprising:
a reception part that receives an image that has been read;

a determination part that determines a registered object to correspond to an object included in the received image that has been read from among previously registered plural objects;

a reflecting part that reflects colors of the image that has been read in previously stored plural similar objects each being similar to the registered object determined by the determination part; and a printing control part that causes a printing apparatus to print the plural similar objects in which the colors have been reflected by the reflecting part.

2. The image recognition apparatus as claimed in claim 1, further comprising:

an inscribed circle extraction part that extracts an inscribed circle inscribed in the object included in the image that has been read;

a circumscribed circle setting part that sets a circumscribed circle circumscribing the object and having a center point the same as a center point of the inscribed circle;

a data generation part that generates a waveform corresponding to the object based on a relative position of an outer shape of the object with respect to the circumscribed circle; and an extraction part that extracts at least one template candidate corresponding to the generated waveform of the object from among waveforms of plural templates stored in a database corresponding to the previously registered plural objects, wherein the determination part determines the registered object to correspond to the object included in the image that has been read based on the at least one template candidate extracted by the extraction part.

3. The image recognition apparatus as claimed in claim 2, wherein the data generation part generates the waveform corresponding to the outer shape of the object based on the relative position of the outer shape of the object calculated based on intersections of lines extending from the center point of the circumscribed circle in radial directions of the circumscribed circle and the outer shape of the object and intersections of the lines and the circumscribed circle.

4. The image recognition apparatus as claimed in claim 3, further comprising

An object dividing part that divides the object included in the image that has been read into plural objects, wherein the data generation part generates the respective waveforms corresponding to the plural objects obtained by the object dividing part, and the extraction part extracts the at least one template candidate corresponding to the waveform of at least any one of the plural objects obtained by the object dividing part.

5. The image recognition apparatus as claimed in claim 4, wherein the determination part narrows down the at least one template candidate corresponding to the object included in the image that has been read based on positional relationship between the respective circumscribed circles of the plural objects obtained by the object dividing part.

6. The image recognition apparatus as claimed in claim 2, wherein the extraction part compares the generated waveform of the object with the respective waveforms of the plural templates stored in the database, using any point of the generated waveform of the object as a starting point.

7. The image recognition apparatus as claimed in claim 2, wherein the extraction part carries out frequency analysis of the waveforms of the plural templates stored in the database and the generated waveform of the object, and extracts the at least one template candidate corresponding to the object based on the analysis result.

8. The image recognition apparatus as claimed in claim 2, wherein the object included in the image that has been read is a three-dimensional object, and respective objects obtained from plural view points corresponding to the three-dimensional object are obtained, the data generation part generates the respective waveforms of the objects of the plural view points, and the extraction part extracts the at least one template candidate for each of the respective objects of the plural view points from three-dimensional templates stored in the database.

9. The image recognition apparatus as claimed in claim 2, wherein the image that has been read is a two-dimensional or three-dimensional moving image.

10. The image recognition apparatus as claimed in claim 8, wherein the data generation part generates the waveforms of the three-dimensional object from a three-dimensional image in a real-time manner.

11. An image recognition method comprising:

receiving an image that has been read;

determining, by a processor, a registered object to correspond to an object included in the received image that has been read from among previously registered plural objects;

reflecting, by the processor, colors of the image that has been read in previously stored plural similar objects each being similar to the registered object determined by the determining; and causing a printing apparatus to print the plural similar objects in which the colors have been reflected by the reflecting.

12. The image recognition method as claimed in claim 11, further comprising:

extracting, by the processor, an inscribed circle inscribed in the object included in the image that has been read;

setting, by the processor, a circumscribed circle circumscribing the object and having a center point the same as a center point of the inscribed circle;

generating, by the processor, a waveform corresponding to the object based on a relative position of an outer shape of the object with respect to the circumscribed circle; and extracting, by the processor, at least one template candidate corresponding to the generated waveform of the object from among waveforms of plural templates stored in a database corresponding to the previously registered plural objects, wherein the determining determines the registered object to correspond to the object included in the image that has been read based on the at least one template candidate extracted by the extracting.

13. The image recognition method as claimed in claim 12, wherein the generating generates the waveform corresponding to the outer shape of the object based on the relative position of the outer shape of the object calculated based on intersections of lines extending from the center point of the circumscribed circle in radial directions of the circumscribed circle and the outer shape of the object and intersections of the lines and the circumscribed circle.

14. The image recognition method as claimed in claim 13, further comprising
dividing the object included in the image that has been read into plural objects, wherein
the generating generates respective waveforms corresponding to the plural objects obtained from the dividing, and
the extracting extracts the at least one template candidate corresponding to the waveform of at least any one of the plural objects obtained from the dividing.

15. The image recognition method as claimed in claim 14, wherein
the determining narrows down the at least one template candidate corresponding to the object included in the image that has been read based on positional relationship between the respective circumscribed circles of the plural objects obtained by the dividing.

16. The image recognition method as claimed in claim 12, wherein
the extracting compares the generated waveform of the object with the waveforms of the plural templates stored in the database, using any point of the generated waveform of the object as a starting point.

17. The image recognition method as claimed in claim 12, wherein
the extracting carries out frequency analysis of the waveforms of the plural templates stored in the database and the generated waveform of the object, and extracts the at least one template candidate corresponding to the object based on the analysis result.

18. The image recognition method as claimed in claim 12, wherein
the object included in the image that has been read is a three-dimensional object, and respective objects obtained from plural view points corresponding to the three-dimensional object are obtained,
the generating generates the respective waveforms of the objects of the plural view points, and
the extracting extracts the at least one template candidate for each of the respective objects of the plural view points from three-dimensional templates stored in the database.

19. The image recognition method as claimed in claim 18, wherein
the generating generates the waveforms of the three-dimensional object from a three-dimensional image in a real-time manner.

20. The image recognition method as claimed in claim 12, wherein
the image that has been read is a two-dimensional or three-dimensional moving image.

* * * * *